(12) United States Patent
Cao et al.

(10) Patent No.: US 10,716,177 B2
(45) Date of Patent: Jul. 14, 2020

(54) METHOD AND APPARATUS FOR CONTROL OF MOBILE AUTOMATION APPARATUS LIGHT EMITTERS

(71) Applicant: Zebra Technologies Corporation, Lincolnshire, IL (US)

(72) Inventors: Feng Cao, Burlington (CA); Harsoveet Singh, Mississauga (CA); Sadegh Tajeddin, Mississauga (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 26 days.

(21) Appl. No.: 16/219,691

(22) Filed: Dec. 13, 2018

(65) Prior Publication Data
US 2020/0196405 A1 Jun. 18, 2020

(51) Int. Cl.
*H04N 5/225* (2006.01)
*H05B 45/00* (2020.01)
*G06T 7/586* (2017.01)
*G01B 11/22* (2006.01)

(52) U.S. Cl.
CPC .............. *H05B 45/00* (2020.01); *G01B 11/22* (2013.01); *G06T 7/586* (2017.01); *H04N 5/2256* (2013.01)

(58) Field of Classification Search
None
See application file for complete search history.

(56) References Cited

U.S. PATENT DOCUMENTS

| 10,373,116 | B2 * | 8/2019 | Medina ................. B64C 39/024 |
| 2014/0133740 | A1 | 5/2014 | Plagemann et al. |
| 2017/0030538 | A1 | 2/2017 | Geisler et al. |
| 2017/0286901 | A1 | 10/2017 | Skaff et al. |

FOREIGN PATENT DOCUMENTS

WO 2018204342 A1 11/2018

OTHER PUBLICATIONS

International Search Report and Written Opinion for International Application No. PCT/US2019/057007 dated Jan. 14, 2020.

* cited by examiner

*Primary Examiner* — Mark T Monk

(57) ABSTRACT

A method of controlling light emitters of a mobile automation apparatus includes: controlling a depth sensor to capture a plurality of depth measurements corresponding to an area containing a support structure; obtaining a support structure plane definition; selecting a subset of the depth measurements; determining, based on the subset of depth measurements and the support structure plane, whether the subset of the depth measurements indicates the presence of a sensitive receptor; when the determination is affirmative, disabling the light emitters; and when the determination is negative, controlling (i) the light emitters to illuminate the support structure and (ii) a camera to capture an image of the support structure simultaneously with the illumination.

20 Claims, 11 Drawing Sheets

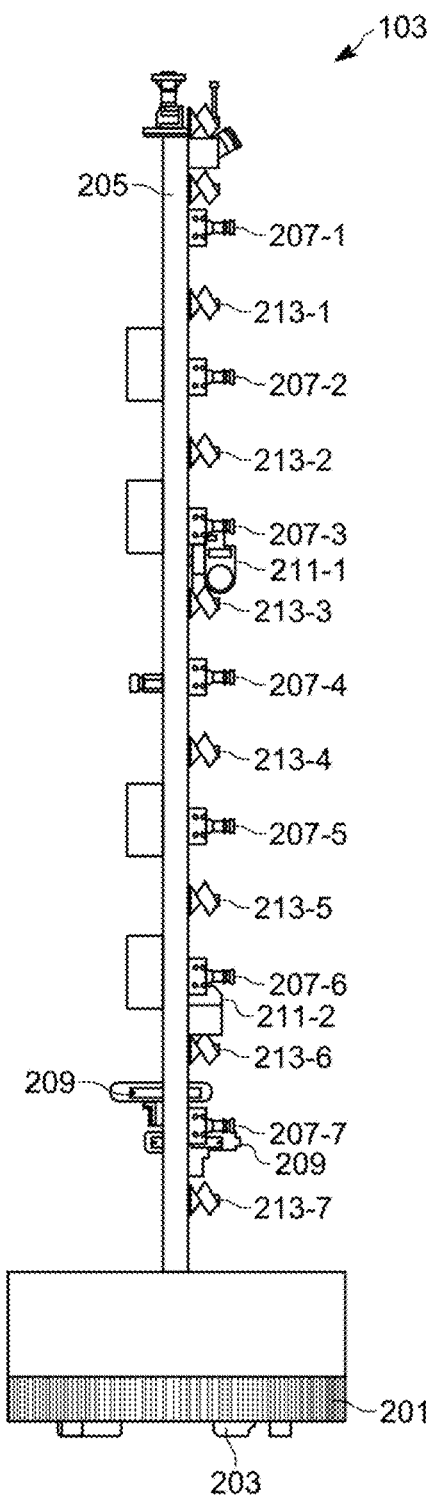
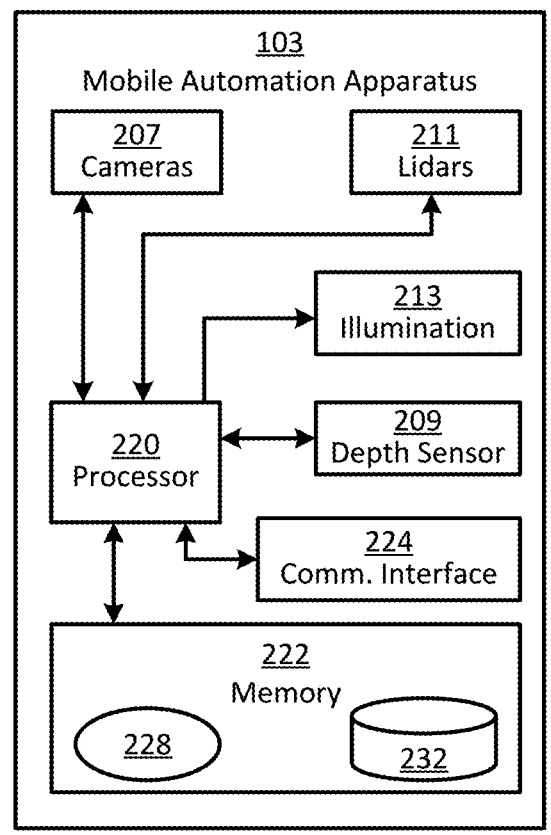
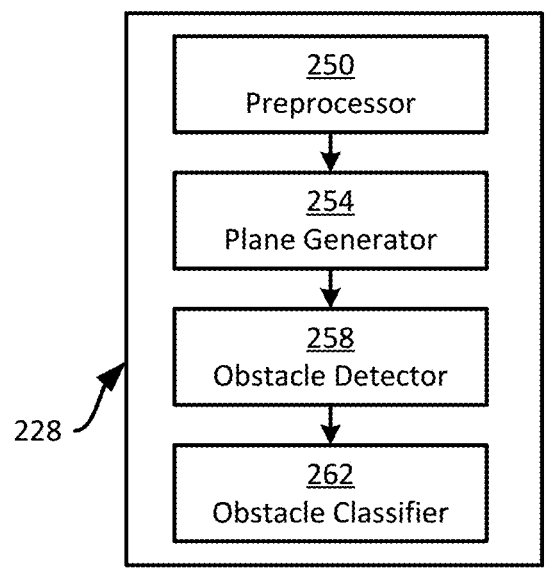
FIG. 2A
FIG. 2B
FIG. 2C

US 10,716,177 B2
// 1

METHOD AND APPARATUS FOR CONTROL OF MOBILE AUTOMATION APPARATUS LIGHT EMITTERS

BACKGROUND

Environments in which objects are managed, such as retail facilities, may be complex and fluid. For example, a retail facility may include objects such as products for purchase, a distribution environment may include objects such as parcels or pallets, a manufacturing environment may include objects such as components or assemblies, a healthcare environment may include objects such as medications or medical devices. Such environments may also be occupied by persons, such as customers, employees, and the like.

A mobile apparatus may be employed to perform tasks within the environment, such as capturing data for use in identifying products that are out of stock, incorrectly located, and the like. The dynamic nature of the environments, as well as the presence and movements of the persons mentioned above, may lead to reduced data capture quality.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2A depicts a mobile automation apparatus in the system of FIG. 1.

FIG. 2B is a block diagram of certain internal hardware components of the mobile automation apparatus in the system of FIG. 1.

FIG. 2C is a block diagram of certain internal components of the mobile automation apparatus of FIG. 1.

Figure 1:
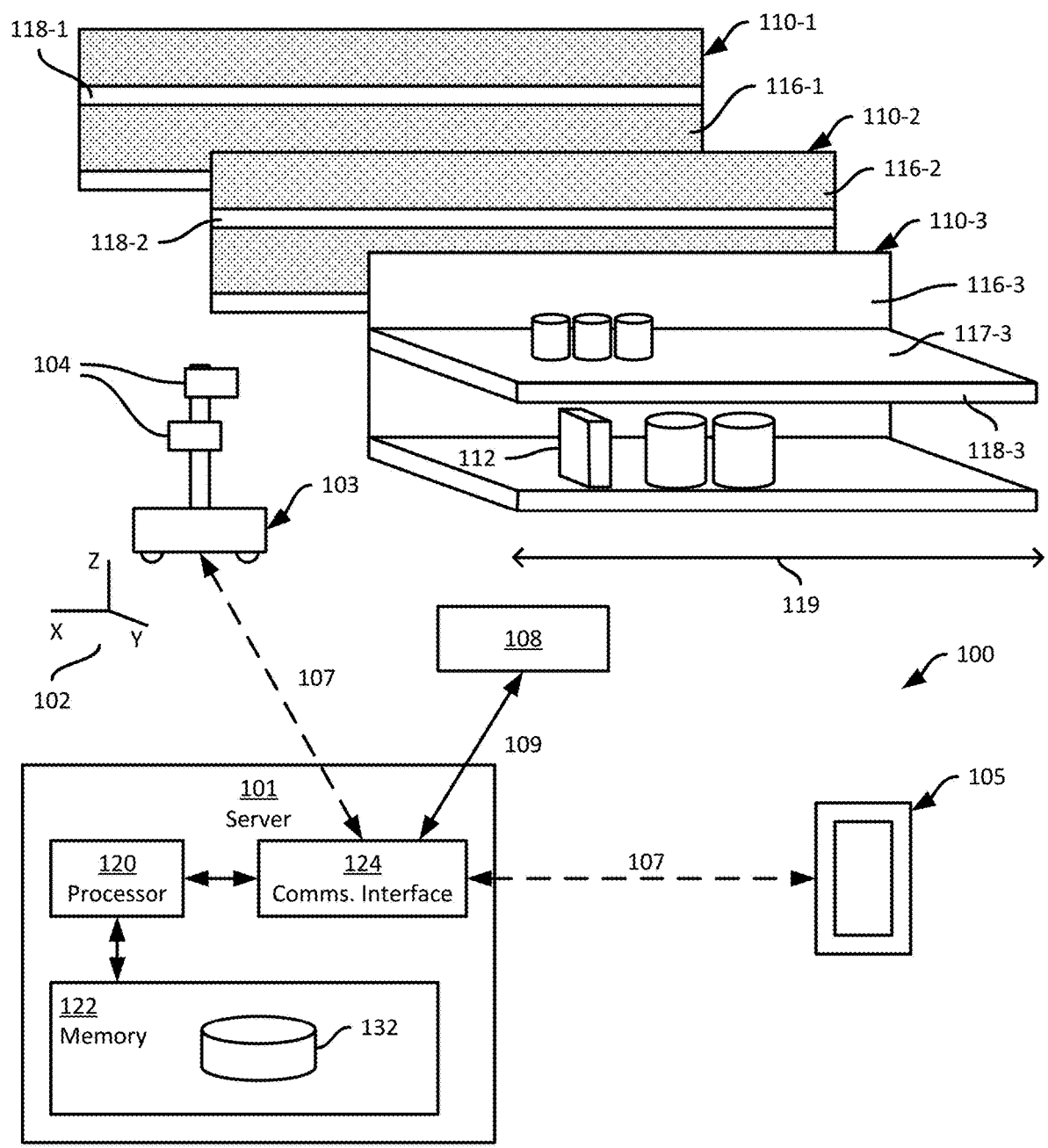
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of controlling light emitters of a mobile automation apparatus, the method comprising: controlling a depth sensor to capture a plurality of depth measurements corresponding to an area containing a support structure; obtaining a support structure plane definition; selecting a subset of the depth measurements; determining, based on the subset of depth measurements and the support structure plane, whether the subset of the depth measurements indicates the presence of a sensitive receptor; when the determination is affirmative, disabling the light emitters; and when the determination is negative, controlling (i) the light emitters to illuminate the support structure and (ii) a camera to capture an image of the support structure simultaneously with the illumination.

Additional examples disclosed herein are directed to a mobile automation apparatus, comprising: a camera configured to capture images of a support structure; a light emitter configured to illuminate the support structure simultaneously with image capture by the camera; a depth sensor; and a navigational controller configured to: control the depth sensor to capture a plurality of depth measurements corresponding to an area containing a support structure; obtain a support structure plane definition; select a subset of the depth measurements; determine, based on the subset of depth measurements and the support structure plane, whether the subset of the depth measurements indicates the presence of a sensitive receptor; when the determination is affirmative, disable the light emitter; and when the determination is negative, control (i) the light emitter to illuminate the support structure and (ii) the camera to capture an image of the support structure simultaneously with the illumination.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points (not shown). In other examples, the server 101, the client device 105, or both, are located outside the retail environment, and the links 107 therefore include wide-area networks such as the Internet, mobile networks, and the like. The system 100 also includes a dock 108 for the apparatus 103 in the present example. The dock 108 is in communication with the server 101 via a link 109 that in the present example is a wired link. In other examples, however, the link 109 is a wireless link.

The client computing device 105 is illustrated in FIG. 1 as a mobile computing device, such as a tablet, smart phone or the like. In other examples, the client device 105 is implemented as another type of computing device, such as a desktop computer, a laptop computer, another server, a kiosk, a monitor, and the like. The system 100 can include a plurality of client devices 105 in communication with the server 101 via respective links 107.

The system 100 is deployed, in the illustrated example, in a retail environment including a plurality of support structures such as shelf modules 110-1, 110-2, 110-3 and so on (collectively referred to as shelves 110, and generically referred to as a shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 are typically arranged in a plurality of aisles, each of which includes a plurality of modules 110 aligned end-to-end. In such arrangements, the shelf edges 118 face into the aisles, through which customers in the retail environment as well as the apparatus 103 may travel. At each end of an aisle, one of the modules 110 forms an aisle endcap, with certain ones of the shelf edges 118 of that module 110 facing not into the aisle, but outwards from the end of the aisle. In some examples (not shown), endcap structures are placed at the ends of aisles. The endcap structures may be additional shelf modules 110, for example having reduced lengths relative to the modules 110 within the aisles, and disposed perpendicularly to the modules 110 within the aisles.

As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees. As those of skill in the art will realize, a support surface is not limited to a shelf support surface. In one embodiment, for example, a support surface may be a table support surface (e.g., a table top). In such an embodiment, a "shelf edge" and a "shelf plane" will correspond, respectively, to an edge of a support surface, such as a table support surface, and a plane containing the edge of the table support surface.

The apparatus 103 is deployed within the retail environment, and communicates with the server 101 (e.g. via the link 107) to navigate, autonomously or partially autonomously, along a length 119 of at least a portion of the shelves 110. The apparatus 103 is configured to navigate among the shelves 110, for example according to a frame of reference 102 established within the retail environment. The frame of reference 102 can also be referred to as a global frame of reference. The apparatus 103 is configured, during such navigation, to track the location of the apparatus 103 relative to the frame of reference 102.

The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 can be configured to employ the sensors 104 to both navigate among the shelves 110 and to capture shelf data during such navigation.

The server 101 includes a special purpose controller, such as a processor 120, specifically designed to control and/or assist the mobile automation apparatus 103 to navigate the environment and to capture data. To that end, the server 101 is configured to maintain, in a memory 122 connected with the processor 120, a repository 132 containing data for use in navigation by the apparatus 103, such as a map of the retail environment.

The processor 120 can be further configured to obtain the captured data via a communications interface 124 for subsequent processing (e.g. to detect objects such as shelved products in the captured data, and detect status information corresponding to the objects). The server 101 may also be configured to transmit status notifications (e.g. notifications indicating that products are out-of-stock, low stock or misplaced) to the client device 105 responsive to the determination of product status data. The client device 105 includes one or more controllers (e.g. central processing units (CPUs) and/or field-programmable gate arrays (FPGAs) and the like) configured to process (e.g. to display) notifications received from the server 101.

The processor 120 is interconnected with a non-transitory computer readable storage medium, such as the above-mentioned memory 122, having stored thereon computer readable instructions for performing various functionality, including control of the apparatus 103 to navigate the modules 110 and capture shelf data, as well as post-processing of the shelf data. The memory 122 includes a combination of volatile memory (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

Turning now to FIGS. 2A and 2B, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 104 mentioned earlier. In particular, the sensors 104 include at least one imaging sensor 207, such as a digital camera, as well as at least one depth sensor 209, such as a 3D digital camera capable of capturing both depth data and image data. The apparatus 103 also includes additional depth sensors, such as LIDAR sensors 211. As shown in FIG. 2A, the cameras 207 and the LIDAR sensors 211 are arranged on one side of the mast 205, while the depth sensor 209 is arranged on a front of the mast 205. That is, the depth sensor 209 is forward-facing (i.e. captures data in the direction of travel of the apparatus 103), while the cameras 207 and LIDAR sensors 211 are side-facing (i.e. capture data alongside the apparatus 103, in a direction perpendicular to the direction of travel). In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is traveling. The apparatus 103 is configured to track a location of the apparatus 103 (e.g. a location of the center of the chassis 201) in a common frame of reference previously established in the retail facility, permitting data captured by the mobile automation apparatus to be registered to the common frame of reference.

The mobile automation apparatus 103 includes a special-purpose controller, such as a processor 220, as shown in FIG. 2B, interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a navigational application 228 which, when executed by the processor 220, configures the processor 220 to perform various functions discussed below in greater detail and related to the navigation of the apparatus 103 (e.g. by controlling the locomotive mechanism 203). The application 228 may also be implemented as a suite of distinct applications in other examples.

The processor 220, when so configured by the execution of the application 228, may also be referred to as a navigational controller 220. Those skilled in the art will appreciate that the functionality implemented by the processor 220 via the execution of the application 228 may also be implemented by one or more specially designed hardware and firmware components, such as FPGAs, ASICs and the like in other embodiments.

The memory 222 may also store a repository 232 containing, for example, a map of the environment in which the apparatus 103 operates, for use during the execution of the application 228. The apparatus 103 may communicate with the server 101, for example to receive instructions to navigate to specified locations (e.g. to the end of a given aisle consisting of a set of modules 110) and initiate data capture operations (e.g. to traverse the above-mentioned aisle while capturing image and/or depth data), via a communications interface 224 over the link 107 shown in FIG. 1. The communications interface 224 also enables the apparatus 103 to communicate with the server 101 via the dock 108 and the link 109.

In the present example, as discussed below, the apparatus 103 is also configured, as will be discussed in detail herein, to detect the presence of objects in or near the path of the apparatus 103. In particular, the apparatus 103 is configured to detect objects such as humans (e.g. customers in the retail environment) that may be sensitive to light emitted by the apparatus 103, and to interrupt the capture of shelf data responsive to such detection.

As will be apparent in the discussion below, in other examples, some or all of the processing performed by the server 101 may be performed by the apparatus 103, and some or all of the processing performed by the apparatus 103 may be performed by the server 101.

Turning now to FIG. 2C, before describing the actions taken by the apparatus 103 to update localization data, certain components of the application 228 will be described in greater detail. As will be apparent to those skilled in the art, in other examples the components of the application 228 may be separated into distinct applications, or combined into other sets of components. Some or all of the components illustrated in FIG. 2C may also be implemented as dedicated hardware components, such as one or more ASICs or FPGAs.

The application 228 includes a preprocessor 250 configured to select a subset of depth measurements (e.g. from a point cloud captured by the depth sensor 209) for further processing to identify and classify obstacles. The application 228 also includes a plane generator 254 configured to generate, based on the captured depth data or a subset thereof (e.g. the subset selected by the preprocessor 250), a plane containing the shelf edges 118 within an aisle containing a plurality of modules 110.

The application 228 also includes an obstacle detector 258, configured to determine whether the depth measurements captured via the depth sensor 209 indicate the presence of an obstacle. The application 228 further includes an obstacle classifier 262, configured to determine whether obstacles detected by the detector 258 are sensitive receptors (e.g. humans). As will be discussed below, the presence of sensitive receptors may cause the apparatus 103 to interrupt the operation of data capture devices such as the illumination assemblies 213.

Figure 3:
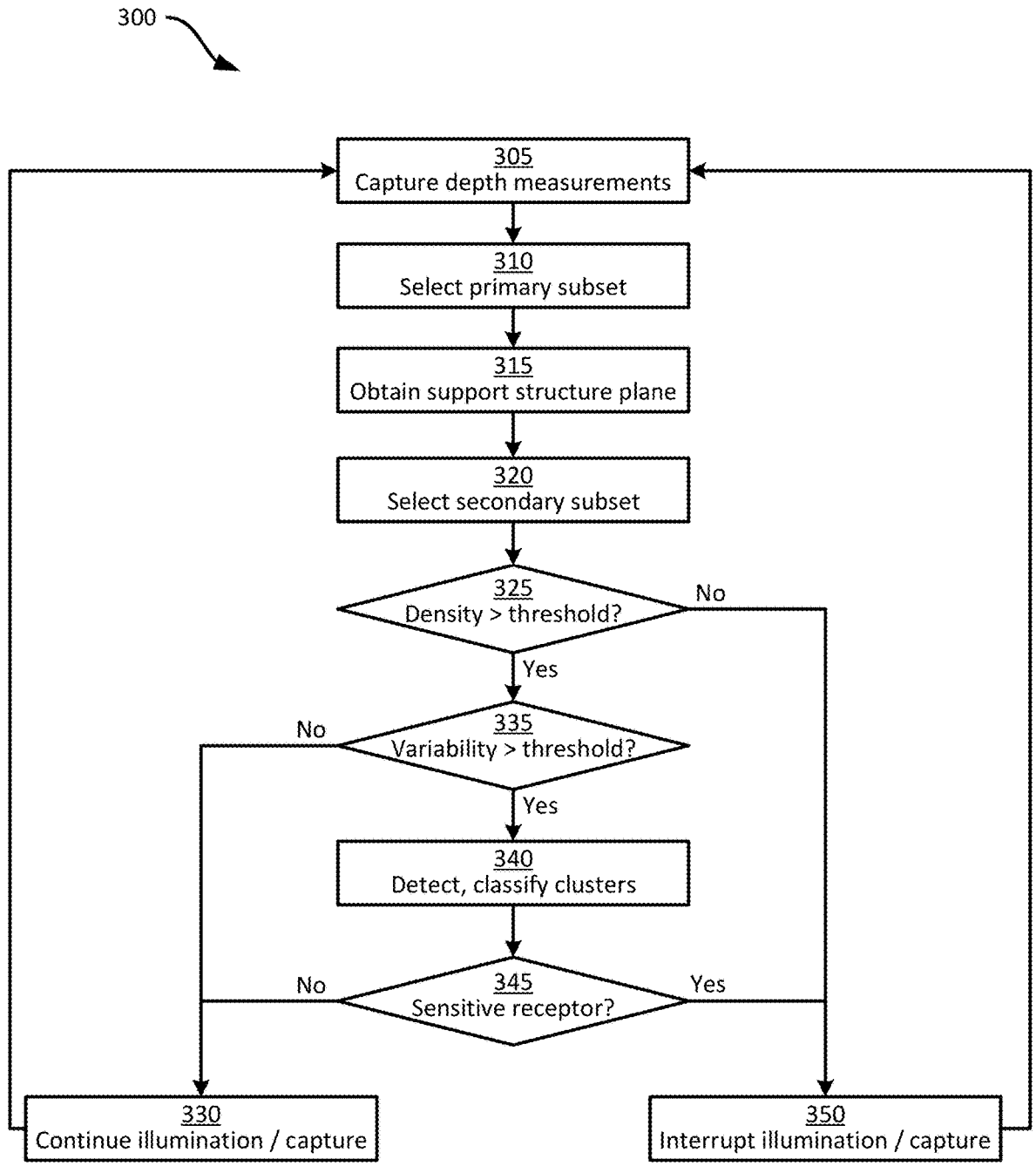
FIG. 3 is a flowchart of a method of controlling light emitters of the mobile automation apparatus of FIG. 1.

The functionality of the application 228 will now be described in greater detail, with reference to FIG. 3. FIG. 3 illustrates a method 300 of controlling light emitters (such as the illumination assemblies 213), which will be described in conjunction with its performance in the system 100, and in particular by the apparatus 103, with reference to the components illustrated in FIGS. 2A-2C.

At block 305, the apparatus 103, and in particular the preprocessor 250 of the application 228, is configured to capture a plurality of depth measurements, also referred to as depth data. In the present example, the depth measurements are captured via control of the depth sensor 209 (i.e. the 3D digital camera) mentioned above. The depth sensor 209 is configured to capture both depth measurements and color data, also referred to herein as image data. That is, as will be apparent to those skilled in the art, each frame captured by the 3D camera is a point cloud including both color and depth data for each point. The point cloud is typically defined in a frame of reference centered on the sensor 209 itself. In other examples, the image data is omitted, and the performance of block 305 includes only the capture of depth data (i.e. of a point cloud).

The apparatus 103 is configured to perform block 305, for example, while traveling within an aisle defined by one or more support structure modules 110. For example, the apparatus 103 can receive a command from the server 101 to travel to a specified aisle and begin a data capture process to capture images and depth measurements along the length 119 of the aisle. While traveling through the aisle, the apparatus 103 is configured to control not only the cameras 207 to capture images of the support structures for subsequent processing (e.g. by the server 101), but also the depth sensor 209 to capture depth data in the direction of travel of the apparatus 103.

Figure 4A:
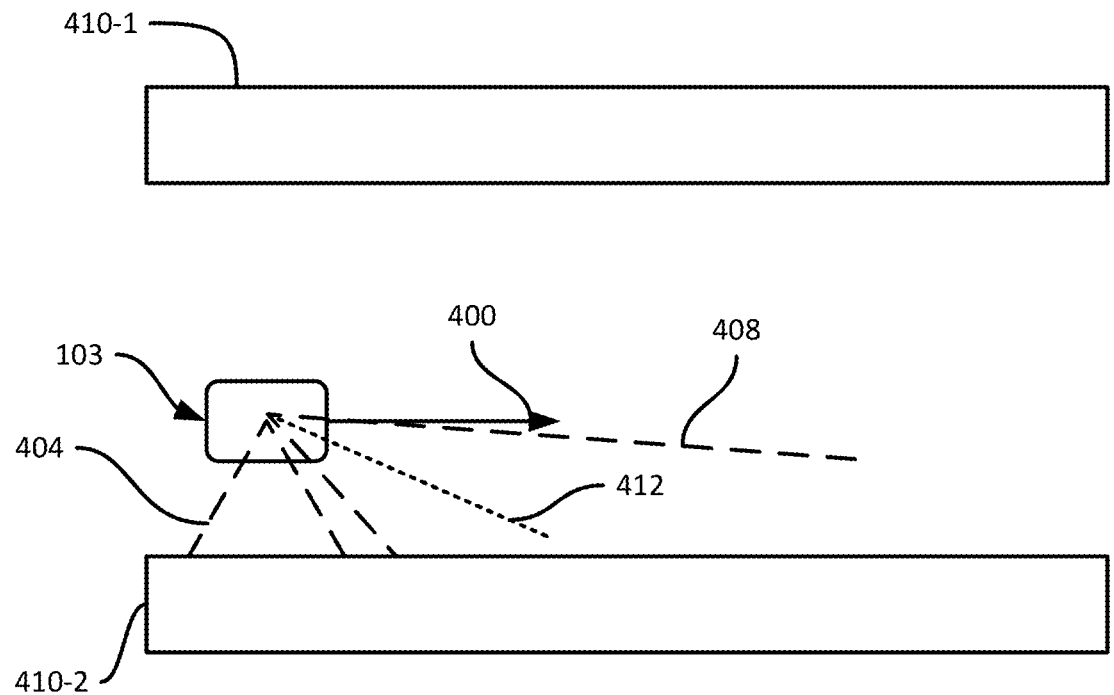
FIG. 4A is an overhead view of the apparatus of FIGS. 2A-2C at block 305 of the method of FIG. 3.

Turning to FIG. 4A, an overhead view of the apparatus 103 is illustrated traveling along an aisle defined by support structures (e.g. shelf modules) 410-1 and 410-2, in a direction of travel 400. While traveling in the direction 400, the apparatus 103 is configured capture images and/or depth measurements corresponding to the support structure 410-2 via control of the cameras 207 and illumination assemblies 213, the LIDAR sensors 211, and the like. A field of view 404 indicates the region of the support structure 410-2 captured at the current position of the apparatus 103.

Figure 4B:
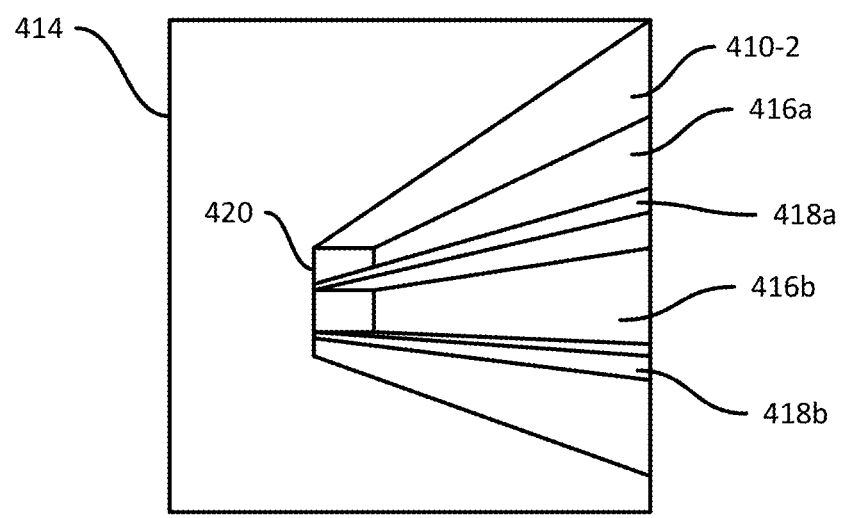
FIG. 4B is a diagram illustrating depth measurements captured at block 305 of the method of FIG. 3.

FIG. 4A also illustrates a field of view 408 of the depth sensor 209. The field of view 408 is centered on an optical axis 412, which is inclined relative to the direction of travel 400 in the present example, but in other embodiments can be parallel to the direction of travel 400. Responsive to control signals from the processor 220, the depth sensor 209 is configured to capture depth measurements corresponding to any objects within the field of view 408. FIG. 4B illustrates depth measurements 414 (i.e. a point cloud) indicating the position of a portion of the support structure 410-2 relative to the depth sensor 209. In particular, shelf backs 416a, 416 and shelf edges 418a, 418b are represented in the depth measurements 414, as is an end 420 of the support structure 410-2.

Returning to FIG. 3, at block 310 the preprocessor 250 is configured to select a primary subset of the depth measurements captured at block 305. The primary subset includes depth measurements satisfying a proximity criterion. More specifically, in the present example the preprocessor 250 is configured to select the primary subset by selecting any depth measurements from the point cloud 414 that are within a specified distance of the depth sensor 209 (and therefore the apparatus 103). The distance may be predefined, or may be dynamically determined, for example according to the speed of travel of the apparatus 103, with greater speeds increasing the distance. To select the primary subset, the preprocessor 250 is configured to generate a cylindrical region with a radius equal to the above-mentioned distance, centered on the depth sensor 209.

Figure 5A:
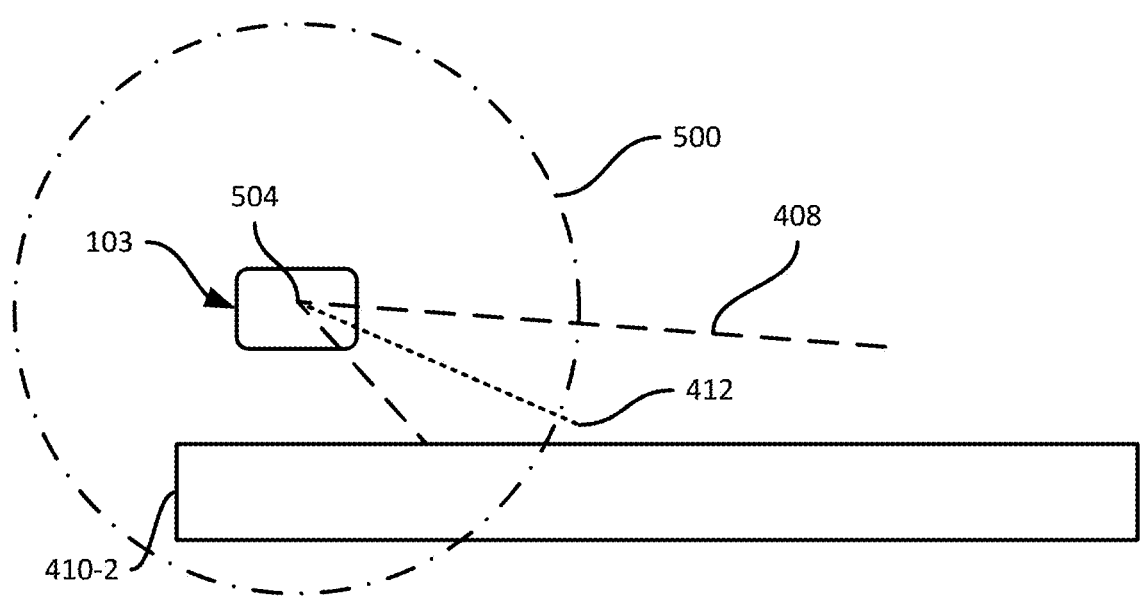
FIG. 5A is an overhead view of the apparatus of FIGS. 2A-2C at block 310 of the method of FIG. 3.
Figure 5B:
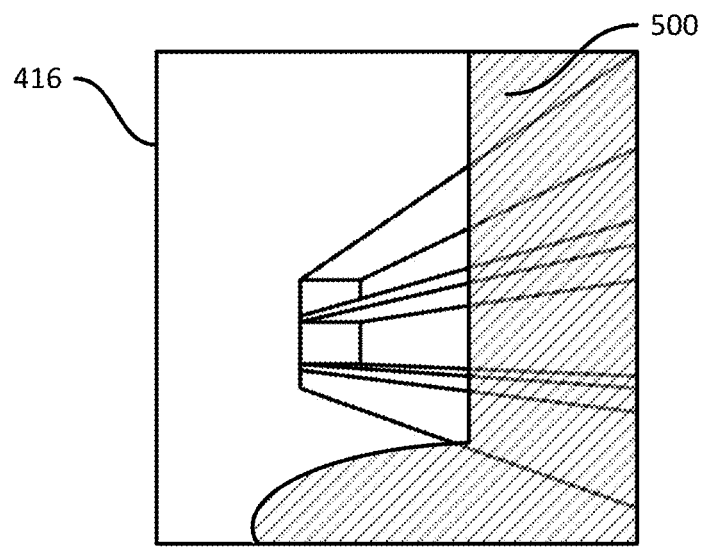
FIG. 5B is a diagram illustrating a primary subset of depth measurements selected at block 310 of the method of FIG. 3.

Turning to FIG. 5A, an overhead view of an example cylindrical region 500 is illustrated, centered on the location 504 of the sensor 209, which is typically the origin of the frame of reference in which the point cloud 414 is captured. The region 500 has a base located at a predefined height relative to the sensor 209 (e.g. to place the base of the region 500 about 2 cm above the floor of the retail facility, so as to eliminate depth measurements representing the floor). The region 500 can also have a predefined height (i.e. a distance from the base to the top of the cylinder) selected to encompass substantially the entire height of the support structures 410 (e.g. about 2 meters). FIG. 5B illustrates the point cloud 414 with a shaded region 500 containing the depth measurements selected as the primary subset at block 310. The remainder of the point cloud 414 is not processed in the remainder of the method 300.

Referring again to FIG. 3, at block 315 the plane generator 254 is configured to obtain a support structure plane definition. The support structure plane is a plane containing the shelf edges 418 shown in FIG. 4B. In other words, the support structure plane represents the "front" of the support structure 410-2 that faces into the aisle. Various mechanisms can be employed by the plane generator 254 to obtain the plane definition. For example, the plane generator 254 can be configured to select local minima from the primary subset of depth measurements selected at block 310 for use in the generation of the shelf plane. More specifically, turning to FIG. 6A, a portion 600 of the region 500 is shown. The plane generator 254 is configured to generate a plurality of sampling planes 604-1, 604-2, 604-3 and so on, extending from the center location 504 at predefined angles through the primary subset of depth measurements.

Figure 6A:
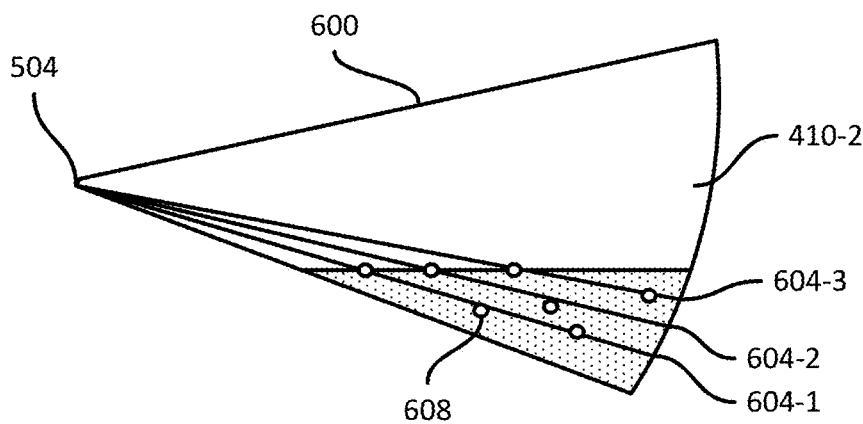
FIGS. 6A, 6B and 6C are diagrams illustrating the generation of a support structure plane at block 315 of the method of FIG. 3.
Figure 6B:
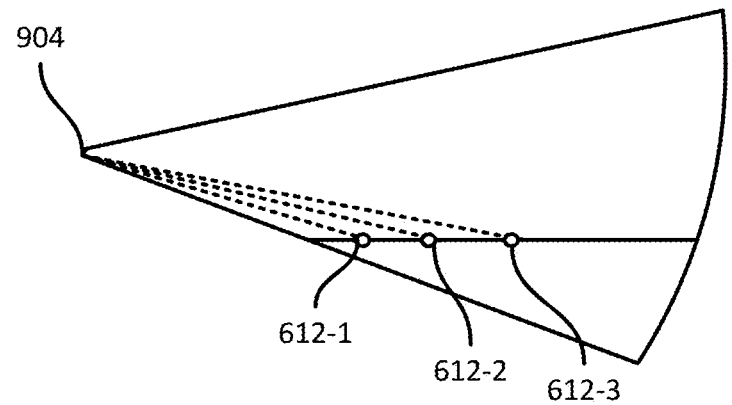

For each sampling plane 604, any depth measurements within a threshold distance of the sampling plane 604 are projected onto the sampling plane 604. A plurality of depth measurements 608 are shown in FIG. 6A as being within the above-mentioned threshold distance of the planes 604. Further, as shown in FIG. 6B, for each sampling plane 604 a single one of the measurements 608 is selected, located closest to the location 504. Thus, three local minimum points 612-1, 612-2 and 612-3 are shown as having been selected in FIG. 6B for further use in shelf plane generation.

Figure 6C:
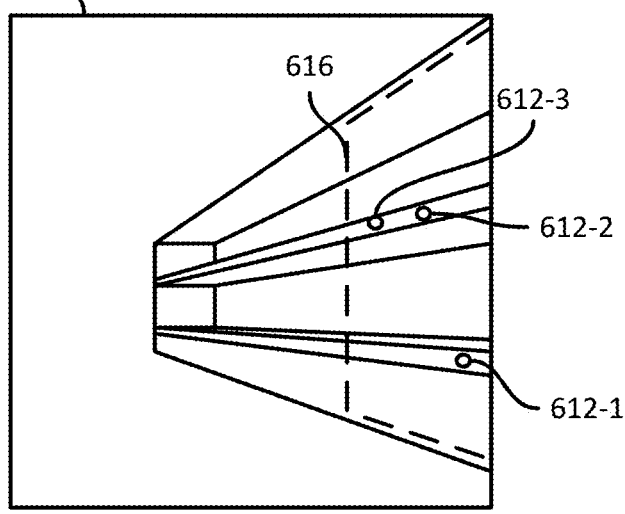

The plane generator 254 is then configured to generate a shelf plane at block 315, by performing a suitable plane-fitting operation (e.g. a RANSAC operation) on the local minima 612. FIG. 6C illustrates the result of such a plane-fitting operation in the form of a shelf plane 616 (the local minima 612 noted above are also highlighted for illustrative purposes). In other examples, image data can be employed to generate the plane 616, instead of or in addition to depth data, for example via detection of the shelf edges 418 in image data captured by the depth sensor 209.

Figure 7A:
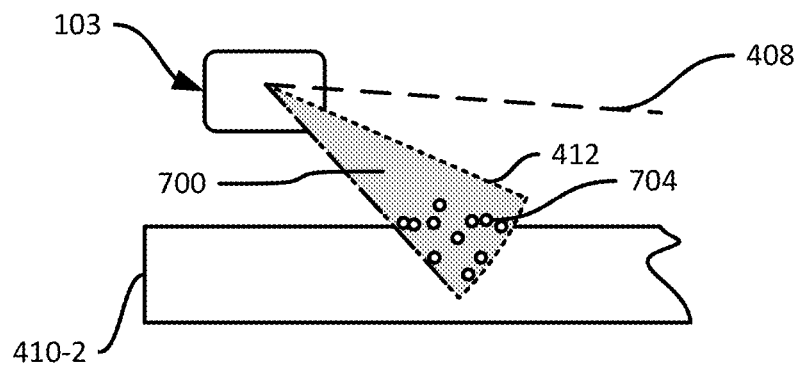
FIGS. 7A, 7B, 8A, 8B, 8C and 8D are diagrams illustrating example secondary subsets of depth measurements selected at block 320 of the method of FIG. 3.

Returning to FIG. 3, at block 320 the preprocessor 250 is configured to select a secondary subset of depth measurements, from the primary subset selected at block 310. The secondary subset is selected, in the present example, based on the optical axis 412 and the field of view 408 of the depth sensor 209. In particular, the secondary subset contains the depth measurements within the region 500, and also between the optical axis 412 and an edge of the field of view 408 closest to the support structure 410-2. FIG. 7A illustrates an overhead view of a region 700 containing the secondary subset of depth measurements. The secondary subset, as shown in FIG. 7A, contains the depth measurements within a wedge-shaped portion of the cylindrical region 500. In other examples, the region 700 containing the secondary subset of depth measurements can extend over a predefined angle on either side of the optical axis 412 (rather than on only one side of the optical axis 412, as shown in FIG. 7A). Example depth measurements 704 of the secondary subset are highlighted in FIG. 7A.

Figure 7B:
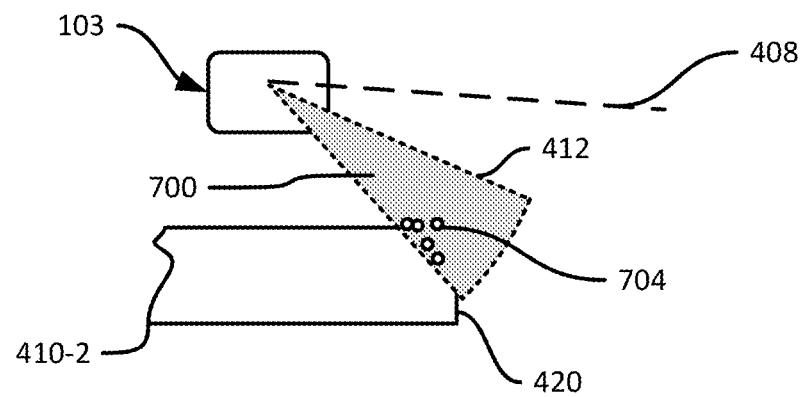

Returning to FIG. 3, at block 325 the obstacle detector 258 is configured to determine whether a point density of the secondary subset selected at block 320 exceeds a density threshold. The density is determined, for example, according to the number of depth measurements in the secondary subset and the volume of the region 700. The density threshold is selected to enable the apparatus 103 to detect whether the end 420 of the support structure 410-2 is within the secondary subset. As will now be apparent, and as illustrated in FIG. 7B, as the apparatus 103 approaches the end 420, the region 700 encompasses fewer depth measurements 704 as a result of empty space beyond the end 420.

When the determination at block 325 is negative (that is, when the point density of the secondary subset does not exceed the threshold), the likelihood of an obstacle being present in the field of view 408 (and more specifically, in the secondary subset of depth measurements) is low. Rather, the secondary subset is likely to represent a portion of the support structure 410-2 adjacent to the end 420. As will now be apparent to those skilled in the art, a portion of the support structure 410-2 that is not adjacent to the end 420, or a portion adjacent to the end 420 when an obstacle is present at or near the end 420, are likely to produce secondary subsets of depth measurements that exceed the density threshold.

Responsive to a negative determination at block 325, the apparatus 103 is therefore configured to proceed to block 350, at which the processor 220 is configured to control the cameras 207, illumination assemblies 213, and the like to interrupt at least the illumination assemblies. Associated data capture operations, e.g. by the cameras 207, LIDARs 211 or the like, may also be interrupted at block 350. The negative determination at block 325 indicates the likely arrival of the apparatus 103 near the end of a support structure, and data capture operations may therefore be substantially complete. In addition, the interruption of the illumination assemblies 213 at block 350 may avoid negative effects to sensitive receptors beyond the end of the support structure (outside the field of view of the depth sensor 209).

When the determination at block 325 is affirmative, the apparatus 103 proceeds to block 335. An affirmative determination at block 325 indicates that the secondary subset of depth measurements selected at block 320 is not likely to represent the end 420 of the support structure 410-2, but is not conclusive as to whether the secondary subset indicates the presence of an obstacle, or whether the secondary subset simply represents the support structure 410-2 itself.

At block 335, the obstacle detector 258 is configured to determine whether the secondary subset of depth measurements selected at block 320 exceeds a variability threshold. Specifically, the obstacle detector 258 is configured to generate a variability metric corresponding to an attribute of the secondary subset, and to compare the variability metric to the variability threshold. Various suitable variability metrics may be employed. For example, the obstacle detector 258 is configured in the present example to determine the distance from each point in the secondary subset to the shelf plane generated at block 315, and to determine the standard deviation of the above-mentioned distances. As will now be apparent to those skilled in the art, when an obstacle is represented in the secondary subset of depth measurements, the depth measurements are likely to have a greater standard deviation than when no obstacle is present, as illustrated in FIGS. 8A-8D.

Figure 8A:
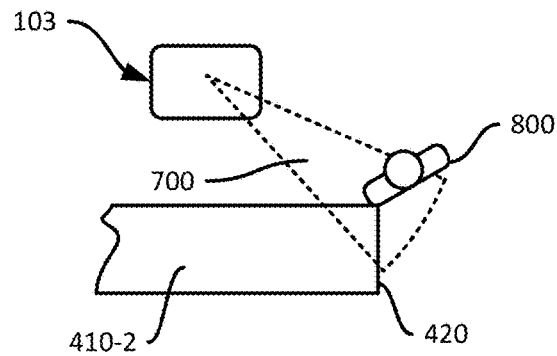
Figure 8B:
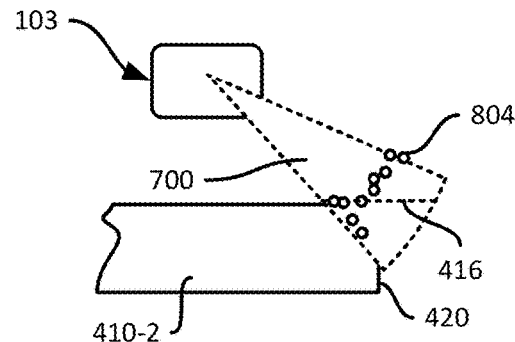
Figure 8C:
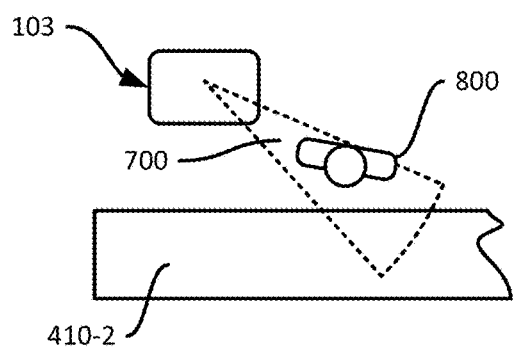
Figure 8D:
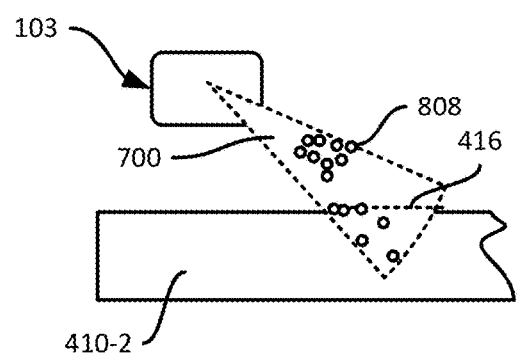

FIG. 8A illustrates a scenario in which a person 800 is in the region 700. As shown in FIG. 8B, a secondary subset of points 804 within the region 700 includes points representing the person 800, as well as points representing a portion of the support structure 410-2 adjacent to the end 420. The additional points resulting from the presence of the person 800 leads to an affirmative determination at block 325. In addition, the points 804 corresponding to the person 800 are more distant from the shelf plane 616 (i.e. are further into the aisle) than the points representing the support structure 410-2 itself. The variability of the secondary subset of points 804 is therefore increased by the presence of the person 800. FIGS. 8C and 8D illustrate a further example, in which the person 800 is within the region 700 when the apparatus 103 is not adjacent to the end 420. The secondary subset of depth measurements includes points 808, shown in FIG. 8D, representing the person 800 and located at greater distances from the shelf plane 616 than the points representing the support structure 410-2 itself.

Referring again to FIG. 3, when the determination at block 335 is negative, indicating that the depth measurements in the secondary subset exhibit variability below the threshold, the apparatus 103 proceeds to block 330, where data capture via control of the cameras 207 and illumination assemblies 213 continues. When the determination at block 335 is affirmative, however, the apparatus 103 is configured to proceed to block 340. The affirmative determinations at blocks 325 and 335 indicate the likely presence of an obstacle within the region 700. At blocks 340 and 345, the apparatus 103 is configured to determine whether the obstacle is a sensitive receptor that may be negatively affected by, for example, the firing of the illumination assemblies 213 during data capture operations.

At block 340, the obstacle classifier 262 is configured to detect and classify one or more clusters among in secondary subset of depth measurements. In the present embodiment, the performance of block 340 is preceded by segmenting the secondary subset to remove any points at a greater distance from the location 504 of the sensor 209 than the plane 616. Segmenting the secondary subset as noted above reduces the computational load associated with cluster detection by reducing the number of points to be processed at block 340.

Figure 9A:
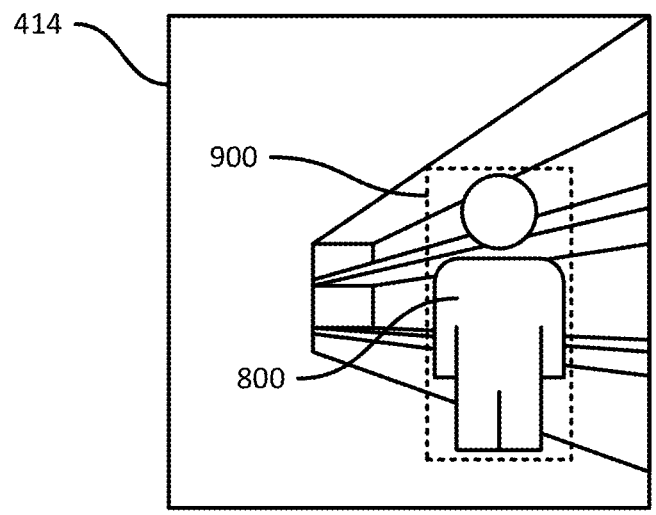
FIGS. 9A and 9B are diagrams illustrating example performances of blocks 340 and 345 of the method of FIG. 3.

The obstacle classifier 262 is configured to perform cluster detection at block 340 according to any suitable clustering operation or set thereof (e.g. Euclidean distance-based clustering). For example, referring to FIG. 9A, the above-mentioned person 800 is shown in the point cloud 414, along with a bounding box 900 indicating a cluster detected at block 340 from the portion of the point cloud 414 representing the person 800. Referring briefly to FIG. 3, at block 345 the obstacle classifier 262 is configured to determine whether the cluster(s) detected at block 340 correspond to one or more sensitive receptors.

Figure 9B:
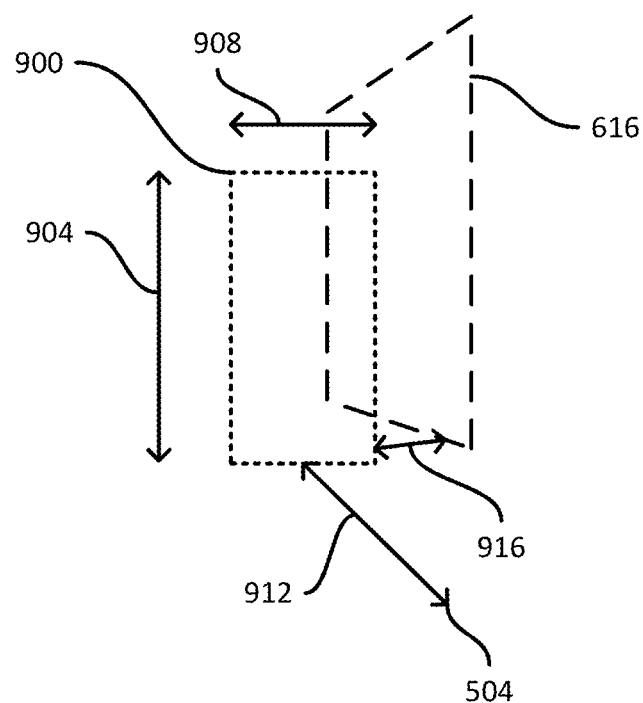

The determination at block 345 includes comparing geometric attributes of each cluster detected at block 340 to one or more geometric thresholds. For example, referring to FIG. 9B, the bounding box 900 and the shelf plane 616 are shown in isolation. At block 345, the obstacle classifier 262 can be configured to determine whether the bounding box has a height 904 that falls between lower and upper height thresholds (e.g. 0.5 m to 1 m), as well as a width that falls between lower and upper width thresholds (e.g. 0.25 m to 0.75 m). As will now be apparent, the thresholds above may be selected to encompass animate objects that are likely to be humans or other suitable sensitive receptors (e.g. service dogs or the like). Other criteria may also be evaluated at block 345, such as whether a distance 912 from the apparatus 103 to the bounding box 900 falls below a threshold. A further example of a criterion applied at block 345 is whether a distance 916 between the bounding box 900 and the shelf plane 616 falls below a further threshold.

When any one of, or a predefined combination of, the above criteria are satisfied, the determination at block 345 is affirmative. For example, when the bounding box 900 is between the above-mentioned height and width thresholds, and also falls within a threshold distance of the apparatus 103 and within a threshold distance of the shelf plane 616, the determination at block 345 is affirmative.

Responsive to an affirmative determination at block 345, the apparatus 103 is configured to proceed to block 350. At block 350, activation of the illumination assemblies 213, for example to support data capture operations, is interrupted. The associated data capture operations, e.g. by the cameras 207, LIDARs 211 or the like, may also be interrupted at block 350. Interruption of the illumination assemblies 213 may reduce the risk of negative effects of the illumination assemblies 213 on sensitive receptors such as persons in the vicinity of the apparatus 103. Following the performance of block 350, the apparatus 103 is configured to return to block 305, to capture a further point cloud.

Variations to the above functionality are contemplated. For example, the apparatus 103 can be configured to perform additional navigational functions following affirmative determinations at blocks 335 and/or 345. For example, following an affirmative determination at block 335 and cluster detection at block 340, the apparatus 103 can be configured to generate an updated navigational path to travel around the obstacle indicated by the cluster(s), regardless of the outcome at block 345.

The apparatus 103 can also be configured to perform additional actions at block 350, such as controlling an output device (e.g. an indicator light, speaker or the like) to generate a warning signal advising persons in the vicinity of the apparatus 103 of the presence of illumination assemblies 213.

Figure 10:
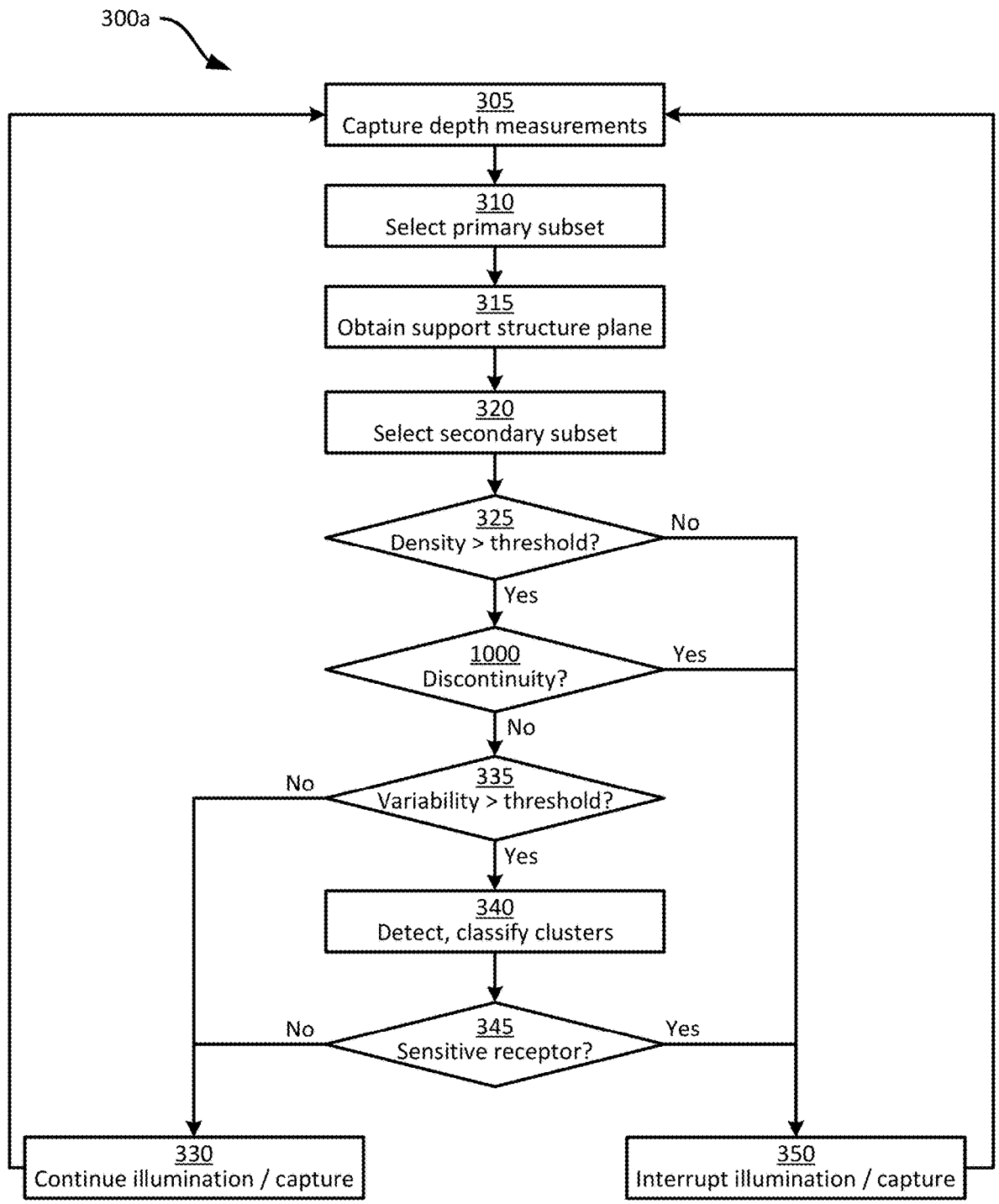
FIG. 10 is a flowchart of another method of controlling light emitters of the mobile automation apparatus of FIG. 1.

In further embodiments, the apparatus 103 is configured to perform one or more additional evaluations to detect the presence, or potential presence, of a sensitive receptor. For example, referring to FIG. 10, a method 300a is illustrated, including the blocks of the method 300 as well as block 1000. Specifically, block 1000 may be performed following an affirmative determination at block 325. At block 1000, the apparatus 103 is configured to determine whether a discontinuity is detected in the secondary subset of depth measurements from block 320. A discontinuity, as will be discussed below, indicates a physical gap in the support structure, such as a gap between adjacent shelf modules 110, 410. In response to detecting such a discontinuity, the apparatus 103 is configured to proceed to block 350 and interrupt operation of the illumination assemblies 213, to avoid negative effects to sensitive receptors beyond the gap (e.g. in a neighboring aisle visible through the gap). When the determination at block 1000 is negative, the performance of the method 300a continues at block 335, as described above.

Figure 11A:
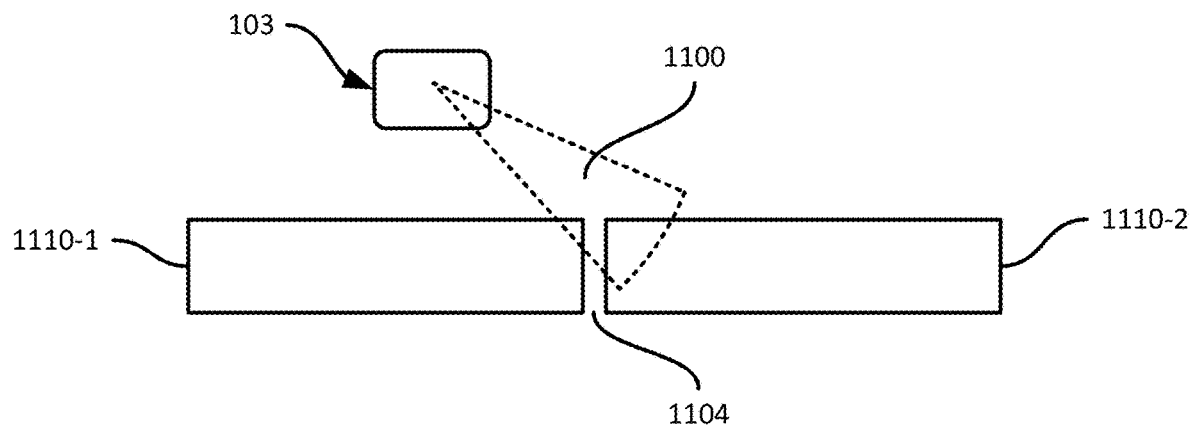
FIGS. 11A and 11B are diagrams illustrating a performance of block 1000 of the method of FIG. 10.
Figure 11B:
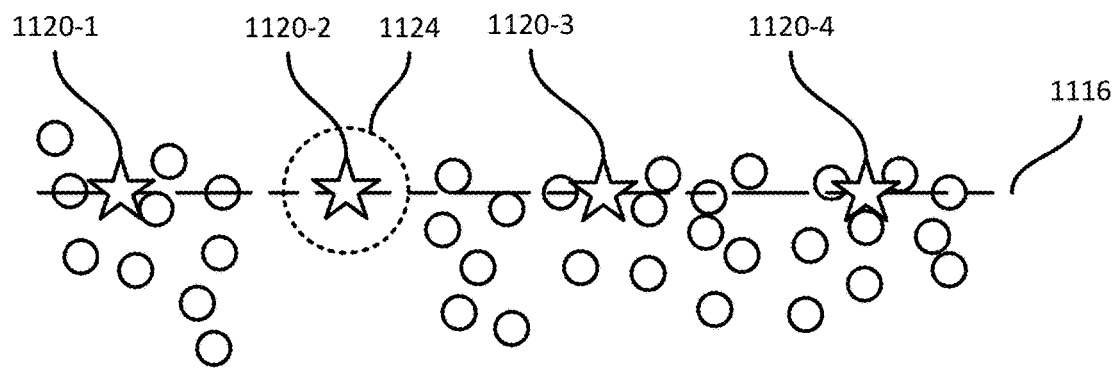

Turning to FIGS. 11A and 11B, an example performance of block 1000 will be described. FIG. 11A illustrates a region 1100 containing a secondary set of depth measurements, selected at block 320. FIG. 11A also shows that the aisle through which the apparatus 103 is travelling includes first and second support structures 1110-1 and 1110-2, with a gap 1104 therebetween.

The secondary subset of depth measurements within the region 1100 are shown in greater detail in FIG. 11B, which also illustrates the position of a support structure plane 1116 (obtained at block 315). To perform block 1000, the apparatus 103 is configured to determine the nearest neighbor distance for each of a set of sampling points 1120-1, 1120-2, 1120-3 and 1120-4 along the plane 1116. That is, for each sampling point 1120, the apparatus 103 is configured to determine a distance to the nearest depth measurement. The sampling points 1120 are separated by a predetermined distance (e.g. 30 cm, although it will be understood that the sampling points 1120 can be separated by more than 30 cm, or less than 30 cm, in other embodiments).

The apparatus 103 is further configured to determine whether the nearest neighbor distance for each sampling point 1120 exceeds a threshold, represented as a region 1124 in FIG. 11B. When the nearest neighbor distance for a given sampling point 1120 exceeds the threshold, the determination at block 1000 is affirmative, indicating that a discontinuity has been detected in the depth measurements along the plane 1116. Thus, in the example of FIG. 11B, the sampling point 1120-2 has no neighbors within the region 1124. That is, the nearest neighbor distance for the sampling point 1120-2 exceeds the threshold defined by the radius of the region 1124. The determination at block 1000 is therefore affirmative. When the determination at block 1000 is affirmative, the apparatus 103 proceeds to block 350. Otherwise, the apparatus 103 proceeds to block 335.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of controlling light emitters of a mobile automation apparatus, the method comprising:
    controlling a depth sensor to capture a plurality of depth measurements corresponding to an area containing a support structure;
    obtaining a support structure plane definition;
    selecting a subset of the depth measurements;
    determining, based on the subset of depth measurements and the support structure plane, whether the subset of the depth measurements indicates the presence of a sensitive receptor;
    when the determination is affirmative, disabling the light emitters; and
    when the determination is negative, controlling (i) the light emitters to illuminate the support structure and (ii) a camera to capture an image of the support structure simultaneously with the illumination.

2. The method of claim 1, wherein selecting the subset comprises:
    selecting a primary subset of the depth measurements within a predefined radius of the depth sensor.

3. The method of claim 2, wherein selecting the subset further comprises:
    selecting, from the primary subset, a secondary subset of the depth measurements within a predefined angle of an optical axis of the depth sensor.

4. The method of claim 1, wherein determining whether the subset of depth measurements indicates the presence of a sensitive receptor comprises:
    determining whether a density of the subset exceeds a density threshold.

5. The method of claim 4, wherein determining whether the subset of depth measurements indicates the presence of a sensitive receptor further comprises:
    when the density exceeds the density threshold, generating a variability metric for an attribute of the subset, and determining whether the variability metric exceeds a variability threshold.

6. The method of claim 5, wherein the attribute is a distance between each depth measurement of the second subset and the support structure plane.

7. The method of claim 5, wherein the variability metric is a standard deviation.

8. The method of claim 5, wherein determining whether the subset of depth measurements indicates the presence of a sensitive receptor further comprises:
    when the variability metric exceeds the variability threshold, detecting a cluster in the secondary subset of depth measurements; and
    determining whether the cluster corresponds to a sensitive receptor.

9. The method of claim 8, further comprising:
    prior to detecting the cluster, discarding a portion of the secondary subset located at distances from the depth sensor greater than a distance between the depth sensor and the support structure plane.

10. The method of claim 8, wherein determining whether the cluster corresponds to a sensitive receptor comprises comparing a geometric attribute of the cluster to a threshold.

11. A mobile automation apparatus, comprising:
    a camera configured to capture images of a support structure;
    a light emitter configured to illuminate the support structure simultaneously with image capture by the camera;
    a depth sensor; and
    a navigational controller configured to:
        control the depth sensor to capture a plurality of depth measurements corresponding to an area containing a support structure;
        obtain a support structure plane definition;
        select a subset of the depth measurements;
        determine, based on the subset of depth measurements and the support structure plane, whether the subset of the depth measurements indicates the presence of a sensitive receptor;
        when the determination is affirmative, disable the light emitter; and
        when the determination is negative, control (i) the light emitter to illuminate the support structure and (ii) the camera to capture an image of the support structure simultaneously with the illumination.

12. The mobile automation apparatus of claim 11, wherein the navigational controller is configured, to select the subset, to:
    select a primary subset of the depth measurements within a predefined radius of the depth sensor.

13. The mobile automation apparatus of claim 12, wherein the navigational controller is further configured, to select the subset, to:
    select, from the primary subset, a secondary subset of the depth measurements within a predefined angle of an optical axis of the depth sensor.

14. The mobile automation apparatus of claim 11, wherein the navigational controller is configured, to determine whether the subset of depth measurements indicates the presence of a sensitive receptor, to:
determine whether a density of the subset exceeds a density threshold.

15. The mobile automation apparatus of claim 14, wherein the navigational controller is configured, to determine whether the subset of depth measurements indicates the presence of a sensitive receptor, to:
when the density exceeds the density threshold, generate a variability metric for an attribute of the subset, and determine whether the variability metric exceeds a variability threshold.

16. The mobile automation apparatus of claim 15, wherein the attribute is a distance between each depth measurement of the second subset and the support structure plane.

17. The mobile automation apparatus of claim 15, wherein the variability metric is a standard deviation.

18. The mobile automation apparatus of claim 15, wherein the navigational controller is configured, to determine whether the subset of depth measurements indicates the presence of a sensitive receptor, to:
when the variability metric exceeds the variability threshold, detect a cluster in the secondary subset of depth measurements; and
determine whether the cluster corresponds to a sensitive receptor.

19. The mobile automation apparatus of claim 18, wherein the navigational controller is further configured to:
prior to detecting the cluster, discard a portion of the secondary subset located at distances from the depth sensor greater than a distance between the depth sensor and the support structure plane.

20. The mobile automation apparatus of claim 18, wherein the navigational controller is configured, to determine whether the cluster corresponds to a sensitive receptor, to compare a geometric attribute of the cluster to a threshold.

* * * * *